(12) United States Patent
Grigorovici et al.

(10) Patent No.: US 9,686,276 B2
(45) Date of Patent: Jun. 20, 2017

(54) COOKIELESS MANAGEMENT TRANSLATION AND RESOLVING OF MULTIPLE DEVICE IDENTITIES FOR MULTIPLE NETWORKS

(71) Applicant: AdMobius, Inc., San Mateo, CA (US)

(72) Inventors: Dan Grigorovici, Pleasanton, CA (US); Omar Abdala, Cambridge, MA (US); Hao Duong, Castro Valley, CA (US)

(73) Assignee: AdMobius, Inc., San Mateo, CA (US)

( * ) Notice: Subject to any disclaimer, the term of this patent is extended or adjusted under 35 U.S.C. 154(b) by 0 days.

(21) Appl. No.: 14/144,351

(22) Filed: Dec. 30, 2013

(65) Prior Publication Data

US 2015/0188897 A1 Jul. 2, 2015

(51) Int. Cl.
*H04L 29/06* (2006.01)
*H04L 29/08* (2006.01)

(52) U.S. Cl.
CPC .......... *H04L 63/0876* (2013.01); *H04L 67/22* (2013.01); *H04L 67/18* (2013.01)

(58) Field of Classification Search
CPC ........................... H04L 63/08; H04L 63/0876
See application file for complete search history.

(56) References Cited

U.S. PATENT DOCUMENTS

| 7,853,475 | B2 | 12/2010 | Deaton et al. |
| 7,925,620 | B1 | 4/2011 | Yoon |
| 7,953,762 | B2 | 5/2011 | Agrawal et al. |
| 8,099,109 | B2 | 1/2012 | Altman et al. |
| 8,180,332 | B2 | 5/2012 | Ramer et al. |
| 8,224,308 | B1 | 7/2012 | Gavrylyako |
| 8,374,912 | B2 | 2/2013 | Paroz et al. |
| 8,402,548 | B1 * | 3/2013 | Muriello ................. G06F 21/60 726/26 |
| 8,404,548 | B2 * | 3/2013 | Park et al. ..................... 438/287 |
| 8,438,184 | B1 * | 5/2013 | Wang ..................... H04L 67/02 707/780 |
| 8,631,006 | B1 | 1/2014 | Haveliwala |

(Continued)

FOREIGN PATENT DOCUMENTS

| EP | 1959347 | 8/2008 |
| JP | 2008-015733 | 1/2008 |

OTHER PUBLICATIONS

Patent Cooperation Treaty, International Search Report and Written Opinion, International Application No. PCT/US2014/072488 dated Dec. 29, 2014.

*Primary Examiner* — Hadi Armouche
*Assistant Examiner* — Hee Song
(74) *Attorney, Agent, or Firm* — Kilpatrick Townsend & Stockton LLP

(57) ABSTRACT

The determination of a unique user is discussed in response to receiving a dataset comprising multiple user identifiers (IDs). In some cases the user IDs may be of a different type. User IDs may be compared directly to determine whether they correspond to a unique user. Network transactions and attributes associated with those network transactions may be compared to determine a probability of whether two user IDs correspond to a unique user. Network transactions and attributes associated with those network transactions may also be compared to determine that two user IDs do not correspond to a unique user.

18 Claims, 10 Drawing Sheets

(56) References Cited

U.S. PATENT DOCUMENTS

| | | | |
|---|---|---|---|
| 8,818,022 B2* | 8/2014 | Muriello | H04N 21/44008 382/100 |
| 8,954,560 B2* | 2/2015 | Johannsen | G06F 21/44 709/223 |
| 9,361,392 B1* | 6/2016 | Saylor | G06F 17/3089 |
| 9,471,920 B2* | 10/2016 | Kolkowitz | G06Q 20/40 |
| 2002/0019764 A1* | 2/2002 | Mascarenhas | G06Q 30/02 707/792 |
| 2003/0163563 A1 | 8/2003 | Bean | |
| 2006/0026063 A1 | 2/2006 | Collins | |
| 2006/0282328 A1 | 12/2006 | Gerace et al. | |
| 2007/0179945 A1 | 8/2007 | Marston et al. | |
| 2007/0208619 A1 | 9/2007 | Branam | |
| 2007/0288457 A1 | 12/2007 | Aravamudan et al. | |
| 2008/0045201 A1 | 2/2008 | Kies | |
| 2008/0195456 A1 | 8/2008 | Fitzpatrick et al. | |
| 2008/0288328 A1 | 11/2008 | Minor et al. | |
| 2009/0076923 A1* | 3/2009 | Warhover et al. | 705/21 |
| 2009/0106082 A1 | 4/2009 | Senti et al. | |
| 2009/0234970 A1 | 9/2009 | Sun | |
| 2010/0100419 A1 | 4/2010 | Natoli et al. | |
| 2010/0100445 A1 | 4/2010 | Flood et al. | |
| 2010/0161728 A1 | 6/2010 | Drozt | |
| 2010/0228625 A1* | 9/2010 | Priyadarshan | G06Q 30/0251 705/14.49 |
| 2010/0229224 A1* | 9/2010 | Etchegoyen | G06F 21/31 726/5 |
| 2010/0287268 A1 | 11/2010 | Bergholm et al. | |
| 2011/0015497 A1 | 1/2011 | Eggenberger | |
| 2011/0035272 A1 | 2/2011 | Bhatt et al. | |
| 2011/0099480 A1* | 4/2011 | Sama | G06F 21/00 715/736 |
| 2011/0225608 A1 | 9/2011 | Lopatecki et al. | |
| 2011/0282964 A1 | 11/2011 | Krishnaswamy et al. | |
| 2012/0042338 A1 | 2/2012 | Kitts et al. | |
| 2012/0166520 A1 | 6/2012 | Lindsay et al. | |
| 2012/0284746 A1 | 11/2012 | Evans et al. | |
| 2012/0316969 A1 | 12/2012 | Metcalf, III | |
| 2012/0317217 A1* | 12/2012 | Lavy | G06Q 10/10 709/206 |
| 2013/0073473 A1* | 3/2013 | Heath | G06Q 30/02 705/319 |
| 2013/0097180 A1 | 4/2013 | Tseng | |
| 2013/0124299 A1 | 5/2013 | Montgomery et al. | |
| 2013/0159298 A1 | 6/2013 | Mason et al. | |
| 2013/0167207 A1* | 6/2013 | Davis | G06F 21/316 726/5 |
| 2013/0197998 A1* | 8/2013 | Buhrmann et al. | 705/14.53 |
| 2013/0218687 A1 | 8/2013 | Sohangir | |
| 2013/0232012 A1 | 9/2013 | Yan | |
| 2013/0282817 A1 | 10/2013 | Montgomery et al. | |
| 2014/0164418 A1* | 6/2014 | Etchegoyen | H04L 63/0876 707/758 |
| 2015/0120391 A1* | 4/2015 | Jodice | G06Q 30/0204 705/7.33 |

\* cited by examiner

| User Identifier (ID) | SHA1MAC | IP |
| --- | --- | --- |
| 65477A6555DFB0B83A75CEA37D01C01A9FD657B4 | CF41A96B9A6E4FE2942B4A51F350D7FD722E38B2 | 173.3.77.115 |
| 68753A44-4D6F-1226-9C60-0050E4C00067 | 8543D2527D8AF3B753DDD732624EF9C7FEDD3005 | 184.65.119.220 |
| 62C7C042511C086 | 8392813EE5E6B4B0D3255BFEF9560189DAFD80709 | 198.73.20.211 |
| 392B8C2319A0DBE4DBFE9C4FE0CED17D4F9988D30 | CFEE6772388898FF28742B4A51F350D7FD722E38B9 | 196.200.144.12 |
| 378B13EA28DAE58AE396354F9EB5515A | EE39A3EE5E6B4B0D3255BFEF9560189DAFD80709 | 188.34.158.25 |
| 82A53F1222F8781A5063A77323ID4A7EE41B0D6F | 94378274B28EF8983942B4A51F350D7FD722E38B1 | 118.74.89.110 |

FIG. 2

COOKIELESS MANAGEMENT TRANSLATION AND RESOLVING OF MULTIPLE DEVICE IDENTITIES FOR MULTIPLE NETWORKS

TECHNICAL FIELD

The present technology pertains to identity management, and more specifically pertains to the authentication and authorization associated with users within or across platforms and devices.

BACKGROUND

The field of identity management has grown in response to the proliferation of digital devices, platforms, and applications in the $21^{st}$ century. For many years using third-party tracking cookies, also known as web cookies, was the method of choice for developers wanting to track and authenticate users. Web cookies are small pieces of data that are stored on a user's web browser when a user accesses content such as a website. Every time a user loads the website, the browser sends a cookie back to a server where the cookie is used to identify a user and notify the website of the user's previous activities. Websites can then use the information they gather to provide insight into consumers' patterns of behavior, interests, etc., which advertisers may use to reach consumers as efficiently and cost-effectively as possible.

As targeted advertising in the digital space continues to advance, many companies are moving away from the collection of third-party cookies to reach consumers. Many mobile applications do not support cookies. Moreover, companies are increasingly using their own proprietary user identifiers (user IDs) to identify unique users across devices and platforms as diverse as desktop computers running Linux to mobile phones or wearable computers running Android. For example, a company such as Apple Inc. of Cupertino, Calif., or Google Inc. of Mountain View, Calif., can monitor a user's behavior using an identifierForAdvertisers (IDFA) or an Android ID, respectively. These IDs allow companies to gain insight into user behavior regardless of whether a user is at their desktop computer, their smart TV, or using any number of mobile devices.

Companies that track user activity work with multiple parties to monetize the information they collect about users. Advertisement exchanges, supply-side platforms (SSPs), and demand-side platforms (DSPs), for example, receive identification information from companies. However, in some cases an identifier such as an IDFA or an Android ID is not passed along to a receiving party. In some cases a hashed version of an ID is provided. Still in other cases an arbitrary user ID is provided. Often times, this leaves companies that receive customer information with disparate and fragmented information. The company can have some information about a customer that comes from Apple, some information about a customer that comes from Google, and some information from companies such as Facebook Inc. of Menlo Park, Calif., Twitter Inc. of San Francisco, Calif., etc., while not knowing that a portion of the received information all corresponds to a single unique user. Thus, companies that receive multiple alias IDs are faced with the difficult task of identifying unique users based on disparate and fragmented information derived from a variety of platforms and devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing information associated with users. In particular, systems and methods for determining co-occurrences of items of inclusion data corresponding to the same user (also referred to as a "unique user," or "same unique user") are disclosed. In various, non-limiting embodiments discussed herein, methods are disclosed wherein a system receives data corresponding to a history of multiple network transactions and attributes related to those transactions (collectively referred to herein as "network transaction attributes" or "attributes"), identifies co-occurrences of data that can correspond to the same user, and determines a probability that the various sets of data correspond to the same unique user.

In various embodiments discussed herein, a system may receive a user ID from a provider. The user ID can come in various types. For example, a user ID can be an IDFA, an Android ID, a web cookie, a hashed version of a user ID, etc. Each user ID is associated with numerous attributes. For example, a user ID can be associated with one or more electronic devices, media access control (MAC) addresses, internet protocol (IP) addresses, geographic locations, operating systems, browser histories, application usage histories, etc. These attributes can be items of inclusion data (e.g., data that can identify a unique user), or these attributes can be items of exclusion data (e.g., data that indicates that two user IDs do not correspond to a unique user). Of course, some attributes can be inclusion data and/or exclusion data based on the embodiment in which they are used.

When attempting to determine whether two user IDs correspond to the same user, various techniques may be applied. For example, the user IDs can be compared to one another to determine if an exact match exists. User IDs can be hashed, or reverse hashed, and compared in a similar fashion. Further, attributes corresponding to user IDs can be compared in an attempt to determine whether the user IDs correspond to the same user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example of a data set comprising user IDs and attributes, in accordance with various embodiments;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The disclosed technology addresses the need in the art for effective and efficient user identity management.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software.

Figure 1:
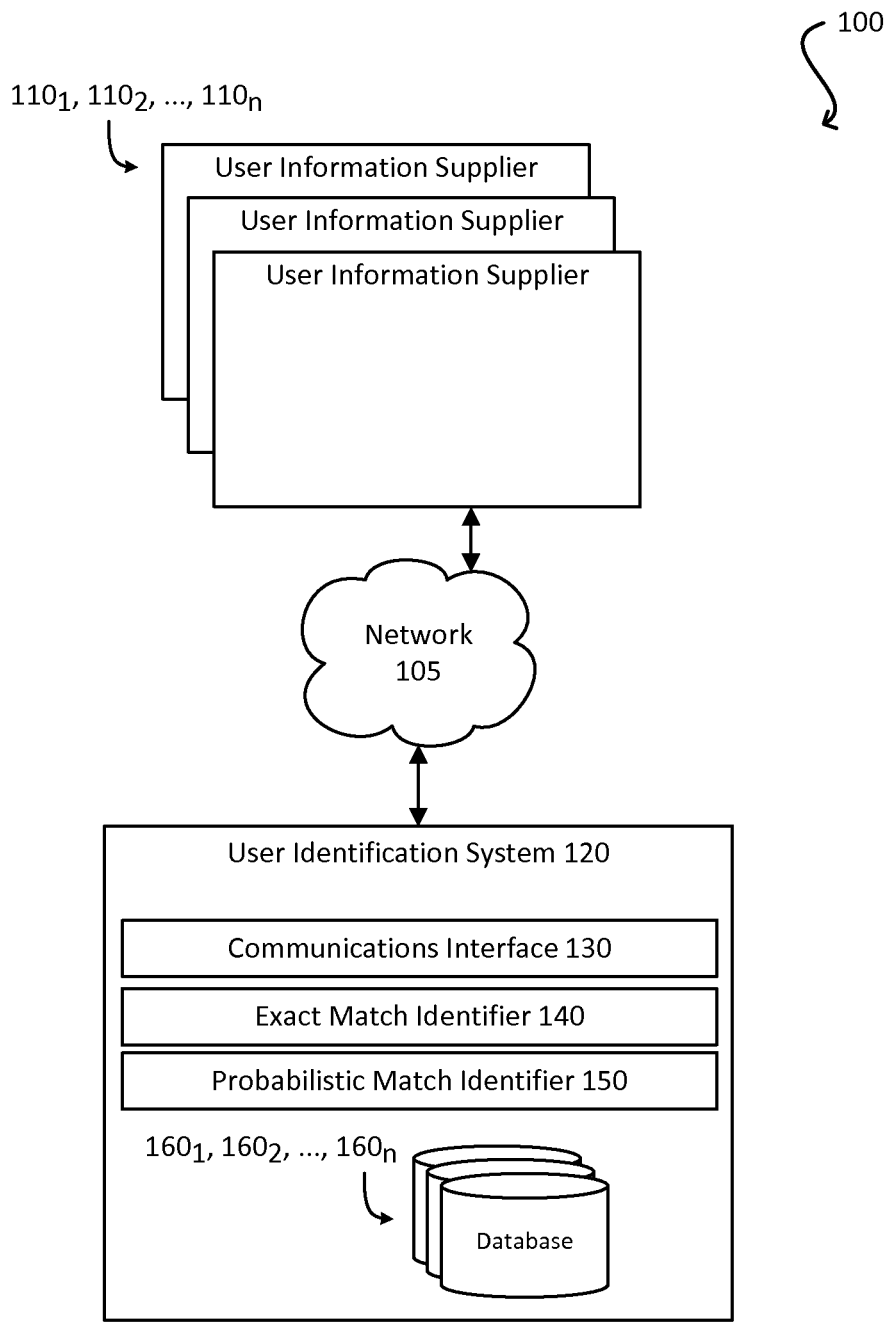
FIG. 1 illustrates an exemplary electronic environment in which methods and systems discussed herein may be executed, in accordance with various embodiments.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, user information suppliers 110₁, 110₂, . . . , 110ₙ (collectively "110") can deliver network transaction and attributes related to the network transactions via network 104 by direct and/or indirect communications with a user identification system 120. Information suppliers and user identification systems can be any network enabled client devices, such as servers or desktop computers. User identification systems can concurrently accept connections from and interact with multiple user information suppliers, and vice-versa.

The user information supplier can receive a request for electronic content, such as a dataset 200 (of FIG. 2) comprising user IDs 201 (of FIG. 2), that includes a history of multiple network transactions and attributes related to those transactions (i.e., attributes). To facilitate communications with the user information suppliers, and/or any other device or component, the user identification system can include a communications interface 130.

A user identification system can include one or more databases 160₁, 160₂, . . . , 160ₙ (collectively "160") to store content. This content can include a dataset comprising user IDs and related attributes. These related attributes can include inclusion data and/or exclusion data. User IDs can be used by an exact match identifier 140. An exact match identifier identifies exact matches, which will be described in greater detail below. User IDs and related attributes can be used by a probabilistic match identifier. A probabilistic match identifier identifies probable matches, as will be also be described in greater detail below.

Inclusion data can be data that indicates that two or more user IDs can correspond with the same user. Any attribute can be a piece of inclusion data. Inclusion data can be data that applies to a relatively small group of people (e.g., less than 50,000, less than 10,000, or less than 1,000). Inclusion data can include temporal or location data (e.g., the number of devices using a given internet protocol (IP) address at a particular point in time, or the number of devices that used a given IP address over a week). Inclusion data can be used to filter user IDs. For example, a dataset of user IDs and related attributes stored in the user identification system can be searched to determine how many users visited a coffee shop in a particular month.

Exclusion data can be data that indicates that two or more user IDs in a given dataset do not correspond to the same user. Exclusion data can include any attribute. Exclusion data can include device information. Exclusion data can also include temporal or location data (e.g., data that indicates that two user IDs were at different places at the same time). For example, exclusion data can indicate that two users were at two different coffee shops at the same time.

As briefly addressed above, the term "attributes" refers to a history of multiple network transactions, attributes associated with those network transactions, and the behavior of users associated with one or more user IDs. Attributes can include channel characteristics, demographic characteristics, behavioral characteristics, and spatial-temporal characteristics. Channel characteristics can define the specific delivery channel being used to deliver data across a network. For example, channel characteristics can include a type of electronic content, a type of device or user terminal, a type of operating system, a carrier or network provider, or any other characteristic that defines a specific delivery channel for a content package. Spatial-temporal characteristics can define a location, a location zone, a date, a time, or any other characteristic that defines a geographic location and/or a time for delivery of a content package. Demographic characteristics can define characteristics of the users corresponding to the user IDs. For example, demographic characteristics can include age, income, ethnicity, gender, occupation, or any other attributes. Behavioral characteristics can define user behaviors for one or more different types of content, separately or in combination with any other attributes. That is, different behavioral characteristics can be associated with different channel, demographic, or spatial-temporal characteristics. Attributes can also include characteristics descriptive of a user's state of mind including characteristics indicative of how likely a user is to click on or convert an item of invitational content if it were displayed to the user. Attributes can be learned directly or derived indirectly from a variety of sources or data suppliers. In some embodiments, attributes can be collected from one or more datasets, as discussed herein.

While the user identification system is presented with specific components, it should be understood by one skilled in the art, that the architectural configuration of the user identification system is simply one possible configuration and that other configurations with more or less components are also possible.

User Identifiers

FIG. 2 shows an example dataset 200 received including user IDs $201_1$, $201_2$, ..., $201_n$ (collectively "201"), each corresponding to a plurality of attributes (e.g., network transactions, attributes associated with those network transactions, MAC addresses 210, IP addresses 220, etc.). While FIG. 2 illustrates a limited number of attributes, many different attributes that are not illustrated are likely. For example, attributes $210_1$, $210_2$, ..., $210_n$ (collectively "210") can refer to hashed MAC addresses of a device associated with a user ID. Similarly, attributes $220_1$, $220_2$, ..., $220_n$ (collectively "220") can refer to un-hashed IP addresses associated with user IDs. Other attributes may include: a time at which a user connected to a particular network, a time at which a user disconnected from a particular network, the location of a user while the user is connected to a particular network, geographic location, channel characteristics, spatial-temporal characteristics, demographic characteristics, etc.

As discussed above, user IDs can come in various formats and types. For example, FIG. 2 shows a plurality of user ID types (e.g., $201_1$, ..., $201_n$). Types of user IDs include, but are not limited to: UDIDs $201_1$, IDFAs $201_2$, Android IDs $201_3$, IDs hashed with a SHA-1 hash $201_4$ (e.g., a UDID hashed with a SHA1 hash), IDs hashed with an MD5 hash $201_5$ (e.g., a UDID hashed with an MD5 hash), ODINs $201_6$, web cookies, application identifiers, a BANGO ID, an AdTruth ID, etc. In some embodiments, multiple user IDs can correspond to the same user. For example, one user can have both an IDFA and an Android ID. In some cases, user IDs can be hashed or otherwise altered multiple times before they are received as part of a dataset such that the same ID will appear as different values.

Below, descriptions of various non-limiting methods and systems are described wherein exact matching is used, and wherein probabilistic matching is used. In some embodiments, exact matching can be used first to determine whether exact matches exist, then probabilistic matching can be used to determine the probability of a match existing. Sometimes only one of these methods may be used, or both may be used in any order (e.g., only using exact matching, or using probabilistic matching followed by exact matching). In some embodiments, a graphical user interface (GUI) may be used to determine the order of the application of exact matching and probabilistic matching.

Exact Matching

With exact matches, a match either: (1) exists; or (2) does not exist. For example, if two user IDs match, they can be determined to be an exact match. As another example, if a hashed version of at least one of two or more user IDs match, those two or more user IDs can be an exact match. Similarly, if at least one of two or more user IDs is reverse hashed, and that reverse hash is found to match another user ID, an exact match can exist. FIG. 3 illustrates an example diagram of a tree 300 that can be used to determine whether user IDs match, wherein the user IDs are hashed or reverse hashed. As described above, when a dataset of user IDs is received by a system, some of the user IDs may correspond to the same user, however those user IDs may have been hashed or reverse hashed such that the user IDs are not identical. In order to determine whether a first user ID is an exact match of a second user ID in a dataset, the first user ID and/or the second user ID may be hashed or reverse hashed and then compared.

Figure 3A:
FIGS. 3A-3C illustrate an exemplary tree diagram of a user ID and its corresponding hashed versions, in accordance with various embodiments.

For example, FIG. 3A shows a tree comprising a single node 310, which includes an SHA-1 hash of an IDFA (also shown in FIG. 2 as element $201_4$). In some embodiments, this IDFA may be compared to every other user ID provided in the dataset, as well as various hashed versions of every other user ID and various reverse hashed versions of every other user ID, to determine whether an exact match exists. As used herein various hashed versions of user IDs may include user IDs that have been hashed with a hashing algorithm such as a SHA-1 algorithm or an MD5 algorithm once, twice, or more times. Similarly, as used herein, various reverse hashed versions of user IDs may include user IDs that have been reverse hashed with hashing algorithm such as a SHA-1 algorithm or an MD5 algorithm once, twice, or more times.

Figure 3B:
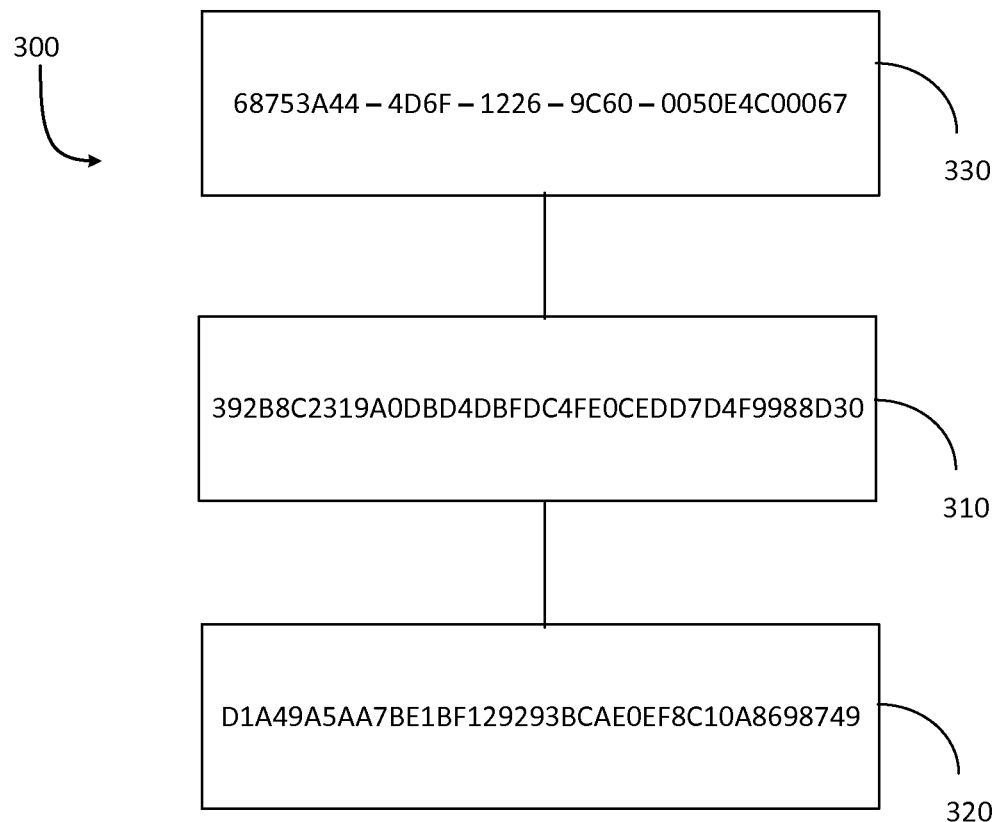

FIG. 3B illustrates the tree 300 from FIG. 3A, but with two additional nodes. Node 320 contains an example SHA-1 hash of an IDFA after being hashed again by a SHA-1 hashing algorithm. Node 330 contains the IDFA after being reverse hashed by a SHA-1 hashing algorithm (also shown in FIG. 2 as element $201_2$). In some embodiments, the IDFA may be compared to other user IDs, as well as reverse hashed user IDs to determine whether an exact match exists (however, an IDFA, when recognized as such is likely a root user ID and thus a reverse hash is unlikely to yield additional matches). In some embodiments, the hashed user ID shown in node 320 may be compared to other user IDs, as well as various hashed versions of every other user ID and reverse hashed versions of every other user ID, to determine whether an exact match exists.

Figure 3C:
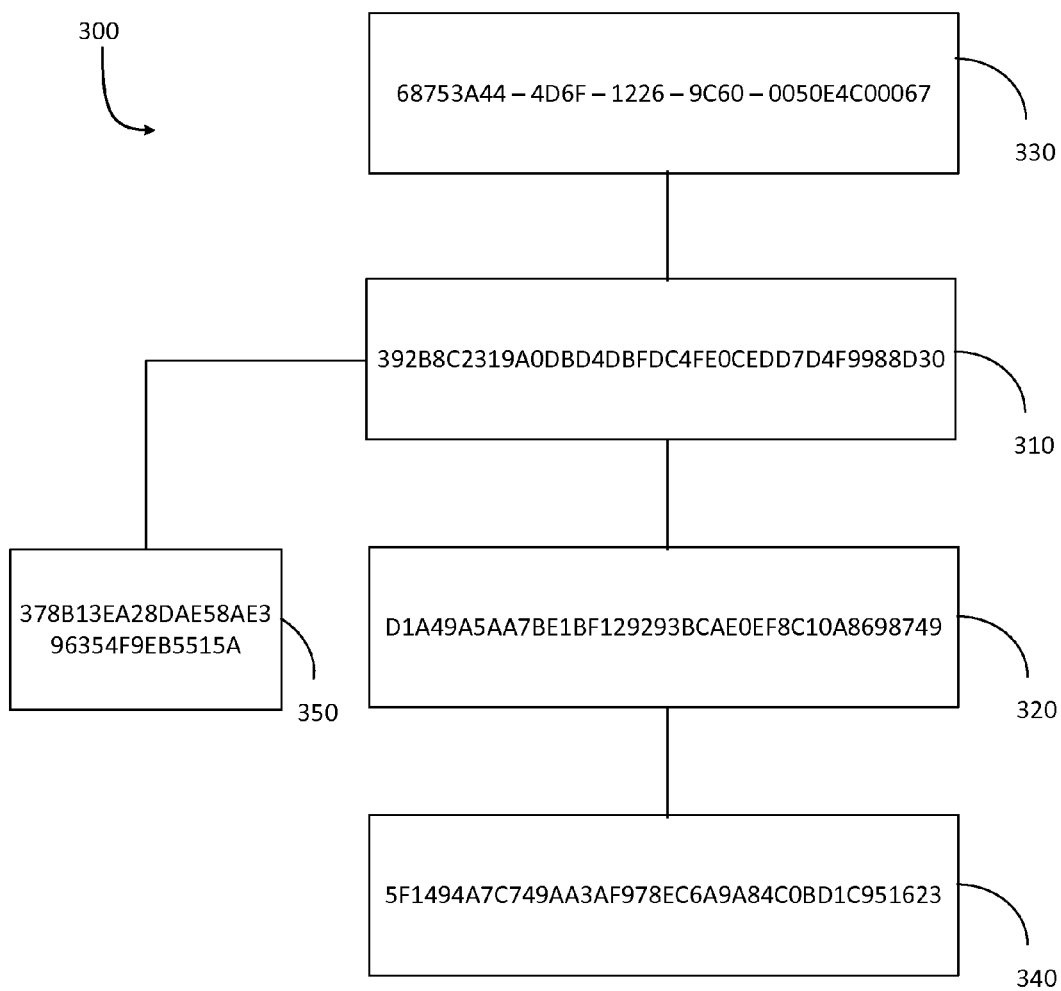

FIG. 3C illustrates the tree 300 from FIG. 3B, but with two more additional nodes. Node 310, 320 and 330 include the same values as in FIG. 3B. Node 340 contains a SHA-1 hashed version of the SHA-1 hashed version of the IDFA (i.e., the IDFA has been hashed twice using a SHA-1 hashing algorithm). Node 350 contains an MD5 hashed version of the SHA-1 hashed version of the IDFA (as shown in FIG. 2 as element $201_5$). In some embodiments, the SHA-1 hashed version of the SHA-1 hashed version of the IDFA shown in node 340 may be compared to other user IDs, as well as various hashed versions of every other user ID and reverse hashed versions of every other user ID, to determine whether an exact match exists. Similarly, in some embodiments, the MD5 version of the SHA-1 hashed version of the IDFA shown in node 350 may be compared to other user IDs, as well as various hashed versions of every other user ID and reverse hashed versions of every other user ID, to determine whether an exact match exists.

As one skilled in the art would understand, user IDs may be forward hashed using a variety of hashing algorithms or reverse hashed using a variety of hashing algorithms. User IDs may then compared to other user IDs, which may or may not have been hashed one or more times, to determine whether an exact match exists. As an example, if a dataset of user IDs were received by the system, and at least two of the user IDs shown in nodes 310, 320, 330, 340 and/or 350 appeared in the dataset, an exact match could be made by hashing or reverse hashing the user IDs shown in nodes 310, 320, 330, 340 and/or 350.

Probabilistic Matching

It should be understood by one skilled in the art that a system may receive a dataset in a variety of formats, and that a dataset can comprise a variety of attributes. For example, while a user ID can correspond with a user's name, address, gender and age, a user ID can also correspond to numerous other attributes such as device attributes, usage attributes, demographic attributes, behavioral attributes, temporal attributes, location attributes, etc. For example such attributes can include: device types, manufacturer information, timestamps, timestamps associated with various network transactions, MAC addresses, IP addresses, browser histories, operating system version, previous operating system versions, dates, user ethnicities, user occupations, shopping histories, advertisement conversion histories, carriers, network types, internet service providers (ISPs), keyboard settings, whether a user is about to have a baby, whether a user want a new car, etc.

With probabilistic matching, attributes corresponding with user IDs are compared to determine whether multiple user IDs correspond to the same unique user. In some embodiments, probabilistic matching is referred to as fingerprinting. As will be discussed below, comparisons can be made using inclusion data, which indicates whether two user IDs correspond to the same unique user. Conversely, in some embodiments comparisons can be made using exclusion data, which indicates whether two user IDs correspond to different unique users.

Probabilistic matching differs from exact matching in that rather than determining that two or more user IDs either do or do not correspond to the same user based on an exact match or not of two user IDs, values are assigned corresponding to a probability that the two or more (usually different) user IDs correspond to the same user. As used herein, the terms probability and a value corresponding to a probability are used interchangeably. In one example, determining that two or more user IDs demonstrate a history of connecting to the same IP addresses can indicate that there is a 70% probability that the two or more user IDs correspond to the same user. In another example, determining that two or more user IDs demonstrate a history of traveling frequently between the same few locations (e.g., work, home, a coffee shop) can indicate that there is a 90% probability that the two or more user IDs correspond to the same user. As a different example, determining that the two or more user IDs correspond to an identical MAC address can indicate that there is an 80% probability that the two or more user IDs correspond to the same user. In general, the likelihood that two or more IDs correspond to the same user increases when there are more identical attributes that correspond to the two or more user IDs. Moreover, the threshold probability required to determine a potential match may be based on a predetermined probability which may be configured by a user, or the threshold probability may be dynamic and change over time. For example, a 70% probability that two or more user IDs are the same can be enough for the system to indicate that a probable match (i.e., when two or more user IDs more likely correspond to the same user than not) has been found. In other cases, a probability of 90%, 99%, or more can be required for the system to indicate that a probable match has been found. The exact probability required is configurable by a system administrator.

In some embodiments, a subset of the dataset of user IDs is created based at least in part on probabilistic matching. In other words, a subset may be created comprising user IDs and their corresponding attributes based on a comparison of inclusion data. For example, if a particular threshold probability is met when comparing the inclusion data of two or more user IDs, the two or more user IDs are placed in a subset together as being possible that the two or more user IDs all represent the same user. Further, in some embodiments, the subset created by comparing inclusion data may further be analyzed to determine entries (i.e., user IDs) that do not correspond to the same users based on exclusion data. For example, of a subset comprising two or more user IDs that met a certain threshold of probability, user IDs that use different operating systems at the same time can be removed from the subset. In some embodiments, the order of applying inclusion data or exclusion data to derive a subset of a dataset, or a subset of another subset, may be reversed (i.e., exclusion data can be applied first to prune a dataset of user IDs, and then inclusion data can be applied to determine whether remaining entries correspond to the same unique user). Additional examples of these two methods of comparing attributes will be discussed in greater detail below.

Probabilistic matching can also assist with ID churn management. ID churn refers to instances where a unique user changes IDs. For example, a user can be associated with one ID for a period of time before changing IDs. In such a case, although probabilistic matching may not compare attributes that occur at the same time, probabilistic matching may compare other attributes that occur at different times. For example, when determining whether a user has changed user IDs, the system can determine whether the times that the user IDs were active overlap or not.

Inclusive Comparisons

As briefly addressed above, in some embodiments, a system can determine the probability that two or more user IDs correspond to the same unique user. To do this, a system can apply inclusion data to determine a probability. In some embodiments, a subset of user IDs is created comprising IDs that match based on the application of the inclusion data the dataset. As used herein, the application of inclusion data to derive possible matches may be referred to as inclusive comparisons. In some embodiments, a subset can be created that stores user IDs and their attributes after inclusion data is applied to a dataset of user IDs.

Inclusion data may include any data that can be used to indicate that two user IDs correspond to the same user. For example, various attributes can indicate that a first ID and a second ID are probably the same user based on the frequency of the co-occurrence of two or more items of inclusive data corresponding to the first ID and the second ID. Items of inclusive data may indicate that that a particular user ID connects to a network via a particular IP address at a particular time. While the fact that a particular user ID connects to a particular IP address at a particular time might not identify a unique user by itself, other attributes may be analyzed in combination to identify unique users. For example, a particular user ID can connect to a plurality of networks at particular times, or over the course of a period, such as day, week, or month, etc. If two or more user IDs concurrently share the same attributes, the probability of a match may be high.

In some embodiments, a system can identify two or more locations associated with a user ID, and then determine whether other user IDs are associated with the same two locations. For example, an analysis of a dataset can indicate that two or more user IDs connect to a network at a house in the mornings and in the evenings. These attributes can also indicate that the user IDs connect to a network at a workplace during the weekdays. Also, these attributes can indicate that a user frequently connects to a network at a coffee shop every morning.

Similarly, combinations of other attributes can be used to determine a probability of whether two user IDs correspond to the same user. For example, application history can be examined. If a first device (e.g., a tablet computer) associated with a first user ID uses the same applications as those on a second device (e.g., a smart phone) associated with a second user ID, the probability that the two user IDs correspond to the same user can increase. In addition, if it is determined that a user logs into a particular application with the same username on the first device and the second device, the probability that the two user IDs correspond to the same user can increase even more.

Exclusive Comparisons

In some embodiments, once a subset of user IDs is created after applying inclusion data to the dataset, exclusion data can be applied. Exclusion data is any data that can be used to determine that two or more user IDs do not correspond with the same user. As with inclusive comparisons, attributes, or a combination of attributes, can be compared to determine that two user IDs do not correspond to the same user. In some embodiments the process can be reversed such that the exclusion data is applied first and the inclusion data is applied after. In some cases only one set of inclusion or exclusion data is applied.

For example, determining that two user IDs were at a different geographic location at the same time can reduce the probability of a match. In some embodiments, at least one entry can be removed either from a dataset or a subset of a dataset. As another example, if one user ID corresponded with a new version of an operating system at some time in the past, while a second user ID corresponded with an older version of the same operating system at a more recent time, a determination can be made that the two user IDs are do not correspond to the same user. To further illustrate this example, if a first user ID corresponded with a device running Apple's operating system iOS 7 on Nov. 20, 2013, and a second user ID corresponded with a device running Apple's operating system iOS 6 on Dec. 31, 2013, the system can determine that the first and second user IDs do not correspond with the same user because it is not likely that user reverted to an earlier version of an operating system. However, in some cases a probability indicating that the first and second user IDs correspond to the same user can simply be lowered. For example, a system discussed herein can contemplate that the user from the above scenario either purchased a new device with an older operating system, or performed a system restore which caused the older operating system to be loaded. As such, the user ID may not be removed from the subset, but instead the probability that a match (i.e., the same user) is found can be reduced. Various configurations, either predetermined or configured by a user can be used to set values associated with different attributes. In addition, in some cases artificial intelligence can be used such that the algorithms used to determine whether two or more user IDs correspond to the same user can be adjusted.

Many attributes or combinations thereof can be used to determine that two or more user IDs do not correspond to the same user. As another example, if a first user ID corresponds to demographic information indicating that the user is a mother and expecting a child in Texas, and a second user ID corresponds to demographic information indicating that the user is a single man that lives in California, a determination can be made that the two user IDs do not correspond to the same user.

Example Flow Diagrams

Figure 4:
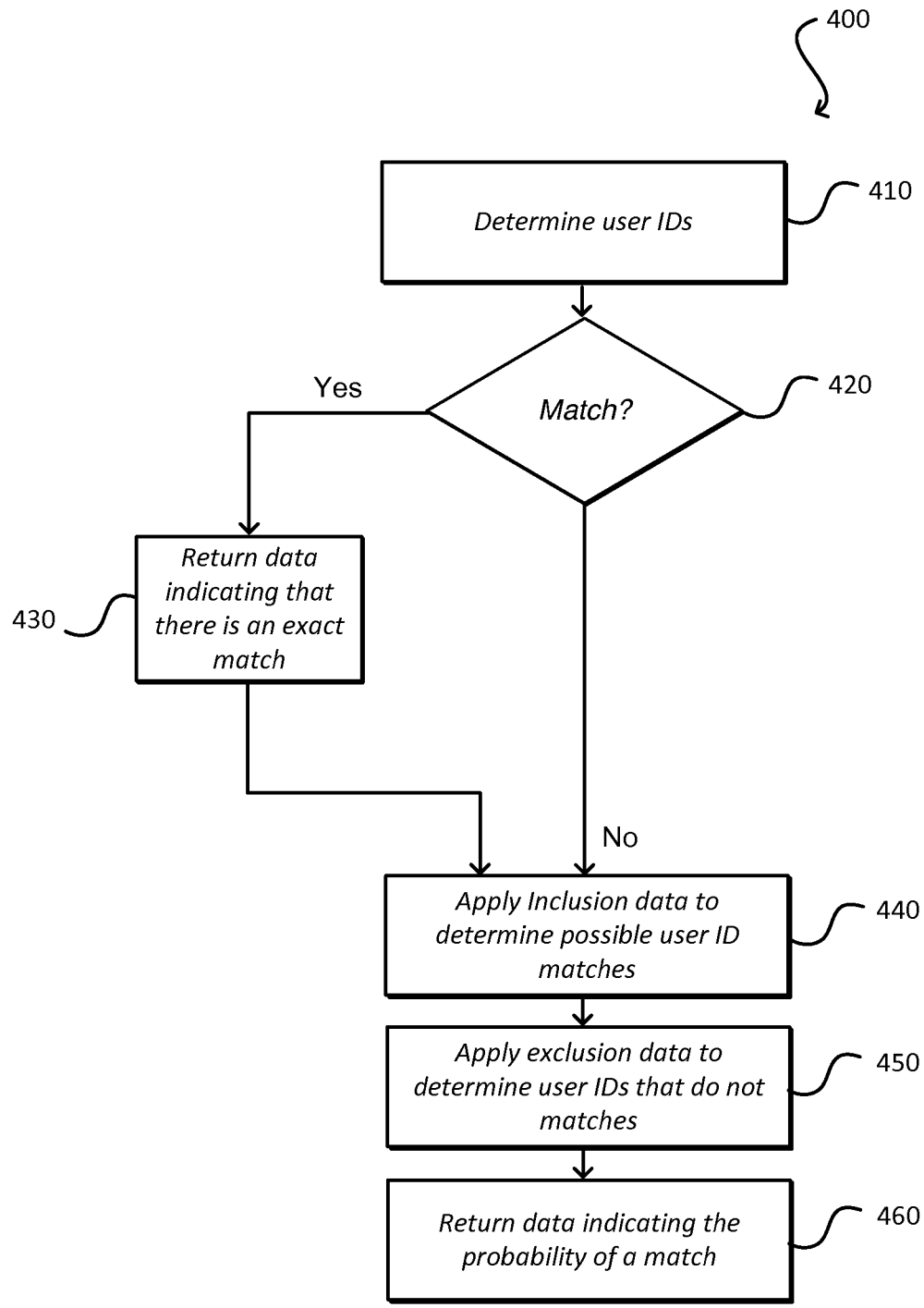
FIG. 4 illustrates an exemplary flow diagram for determining whether two or more user IDs belong to the same user, in accordance with various embodiments.

FIG. 4 illustrates an example flow diagram 400 for receiving a set of data including a plurality of user IDs, and de-duplicating entries where the user ID corresponds to the same unique user, in accordance with various embodiments. It should be understood that for methods and processes described herein, there can be additional, fewer, or alternative steps performed in similar or alternative orders, or at least partially in parallel, within the scope of the various embodiments unless otherwise stated. For example, a step may be added that manipulates data associated with a user ID. Thus, it should be appreciated that while flow diagram 400 shows that steps 410, 420 and 430 are each performed, in accordance with one embodiment, steps 410, 420 and 430 each describe steps that may, or may not, be performed in any order. In other words diagram 400 should not be construed as anything other than an example.

Step 410 of flow diagram 400 determines the user IDs. In some cases, multiple user IDs can be identical. User IDs may be a hexadecimal set of characters that can be hashed or reverse hashed one or more times and then compared to other user IDs to determine whether a match exists.

Step 420 of flow diagram 400 determines whether a match exists. If a match does exist, the flow diagram continues to step 430. If a match does not exist, the flow diagram continues to step 440.

Step 430 of diagram 400 describes returning data indicating that there is an exact match. As addressed above, this can mean that two user IDs were a match. Step 420 is shown in more detail in flow diagram 500 (of FIG. 5). After step 430, flow diagram 400 continues to step 440.

Step 440 of diagram 400 describes applying inclusion criteria to determine the probability of a match. As discussed above, data associated with two or more user IDs' network transactions can be compared using inclusion data to generate a value corresponding to a probability that the two or more user IDs belong to the same user.

Step 450 of diagram 400 describes applying exclusion data to determine user IDs that do not correspond to the same user. In some embodiments, a subset of a dataset is created after inclusion data is applied, and then that subset is further pruned when exclusion data is applied. Steps 440 and 450 are shown in more detail in flow diagram 600 (of FIG. 6).

Step 460 of diagram 400 discusses returning data indicating the probability of two or more user IDs corresponding to the same unique user.

Figure 5:
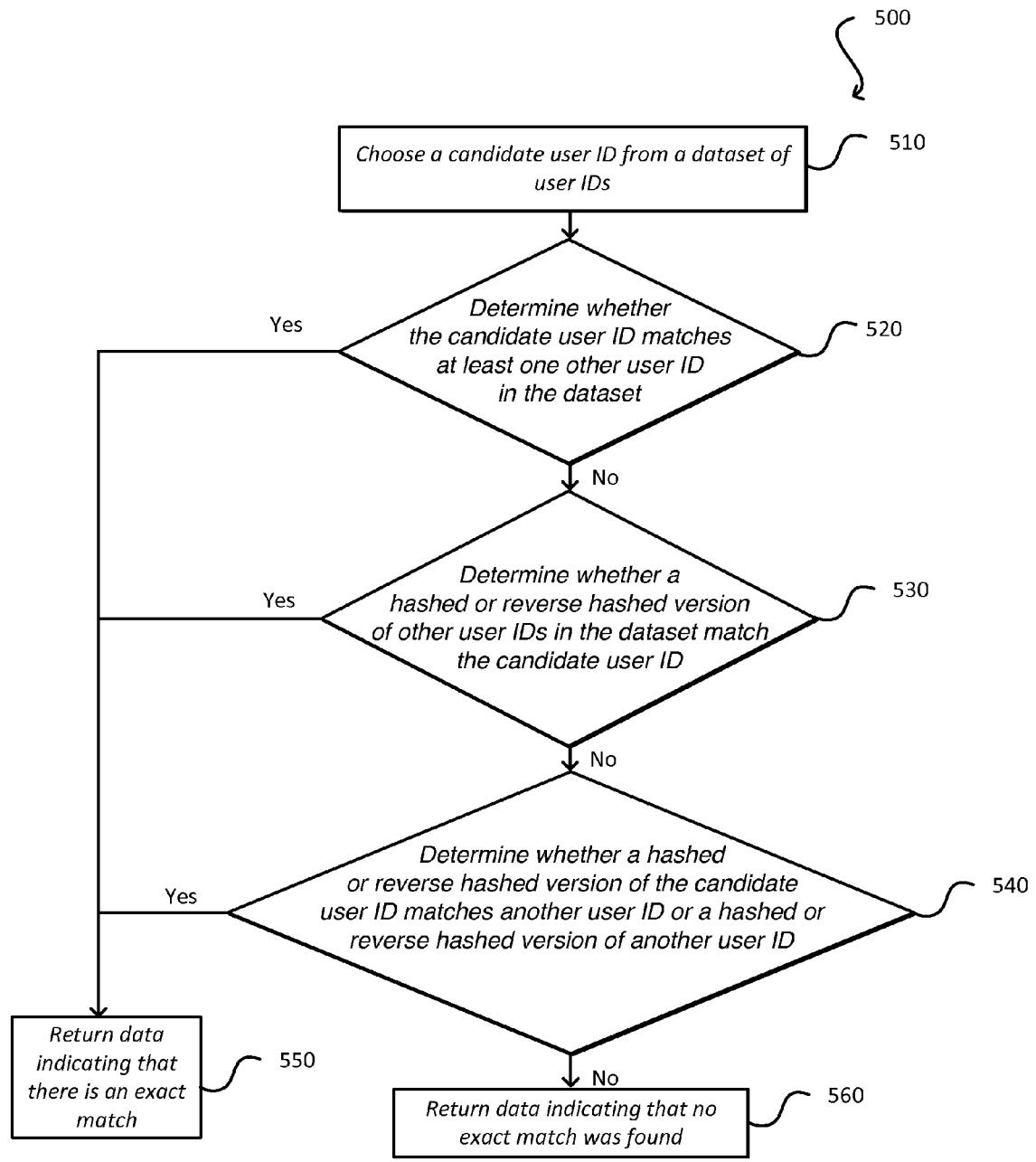
FIG. 5 illustrates an exemplary flow diagram for determining whether two or more user IDs belong to the same user, in accordance with various embodiments.

FIG. 5 illustrates an example flow diagram 500 for receiving a set of data including a plurality of user IDs, and de-duplicating entries where the user ID corresponds to the same unique user, in accordance with some embodiments. It should be understood that for methods and processes described herein, there can be additional, fewer, or alternative steps performed in similar or alternative orders, or at least partially in parallel, within the scope of the various embodiments unless otherwise stated. For example, a step may be added that manipulates data associated with a user ID. Thus, it should be appreciated that while flow diagram 500 shows that steps 510, 520 and 530 are each performed, in accordance with one embodiment, steps 510, 520 and 530 each describe steps that may, or may not, be performed in any order. In other words diagram 500 should not be construed as anything other than an example.

Step 510 of flow diagram 500 discusses choosing a candidate user ID from a dataset. The candidate user ID may be of any type, and may be chosen at random.

Step 520 of flow diagram 500 determines whether the candidate user ID matches at least one other user ID in a dataset, and if a match is found the flow diagram continues to step 550 and returns data that indicates that an exact match was found.

Step 530 of flow diagram 500 determines whether a hashed or reverse hashed version of other user IDs in the dataset matches the candidate user ID. It should be understood that in some embodiments, for each dataset of user IDs, hashing can occur once or multiple times, forward or backward, and compared after each hash. In some embodiments, hashing can occur multiple times, forward or backward, and each hash may be compared after all the hashing has been performed. For example, every user ID may be hashed using a SHA-1, MD5, or another hashing algorithm and then compared against the candidate user ID. In some embodiments, each user ID other than the candidate user ID is hashed and then compared to the candidate user ID prior to hashing and comparing another user ID in the dataset. In some embodiments, every user ID other than the candidate ID is hashed first, and then each hashed user ID is compared to the candidate user ID. The same process may be applied using reverse hashing. For example, each user ID other than the candidate user ID may be reverse hashed, and then compared to the candidate ID before reverse hashing another user ID. In another example, every user ID other than the candidate user ID is reverse hashed first, and then each reverse hashed user ID is compared to the candidate ID. Similarly, the same process can be used for hashing or reverse hashing user IDs multiple times. If a match is found the flow diagram continues to step 550 and returns data that indicates that an exact match was found.

Step 540 of flow diagram 500 discusses determining whether a hashed or reverse hashed version of the candidate user ID matches another user ID or a hashed or reverse hashed version of another user ID. Similar to the examples described with respect to step 530, in some embodiments a candidate user ID may be hashed or reverse hashed, and then compared to other user IDs, or other hashed or reverse hashed versions of other user IDs. If a match is found the flow diagram continues to step 550 and returns data that indicates that an exact match was found. If a match is not found the diagram continues to step 560 and returns data that indicates that no exact match was found.

Step 550 of flow diagram 500 describes returning data indicating that an exact match was found. This data may include additional information, such as one or more user IDs, attributes corresponding to the one or more user IDs, what type of format the user IDs were in that matched, etc.

Step 560 of flow diagram 500 describes returning data indicating that no exact match was found.

Figure 6:
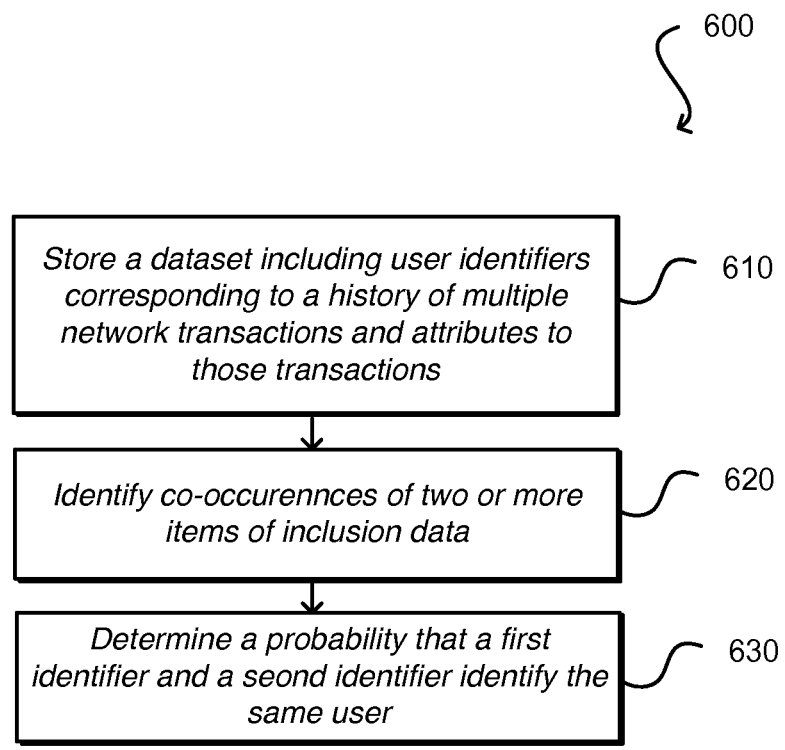
FIG. 6 illustrates an exemplary flow diagram for determining whether two or more user IDs belong to the same user, in accordance with various embodiments.

FIG. 6 illustrates an example flow diagram 600 for receiving a set of data including a plurality of user IDs, and de-duplicating entries where the user ID corresponds to the same unique user, in accordance with some embodiments. It should be understood that for methods and processes described herein, there can be additional, fewer, or alternative steps performed in similar or alternative orders, or at least partially in parallel, within the scope of the various embodiments unless otherwise stated. For example, a step may be added that manipulates data associated with a user ID. Thus, it should be appreciated that while flow diagram 600 shows that steps 610, 620 and 630 are each performed, in accordance with one embodiment, steps 610, 620 and 630 each describe steps that may, or may not, be performed in any order. In other words diagram 600 should not be construed as anything other than an example.

Step 610 of flow diagram 600 discusses storing a dataset including identifiers corresponding to a history of multiple network transactions and attributes related to those transactions, in accordance with an embodiment. The attributes related to those transactions can include items of inclusion data. As described above, this inclusion data can include information related to at least one IP address and at least one geographic location of an electronic device. In some embodiments, the IP address(es) and the geographic location(s) associated with various network transactions and/or time(s) can be used to increase the probability that two user IDs correspond to a unique user.

Step 620 of flow diagram 600 discusses identifying co-occurrences of two or more items of inclusion data, wherein the two or more items correspond to the same unique user, in accordance with an embodiment. As with the example above, since there are co-occurrences (i.e., identical occurrences) of the IP address(es) and the geographic location(s) at the same frequencies, a unique user can be identified. In some cases, co-occurrences of items of inclusion data can increase a value corresponding to a probability that the co-occurrences correspond to the same user greatly, while in other cases co-occurrences of items of inclusion data can only slightly increase a value corresponding to a probability that the co-occurrences correspond to the same user.

Step 630 of diagram 600 discusses determining a probability that a first ID and a second ID identify the same user based on frequency of co-occurrence of two or more items of inclusion data corresponding to the first ID and the second ID, in accordance with an embodiment. For example, if two user IDs indicate that their respective users access the same IP address associated with the same location every weekday at a certain time, and that those two user IDs access a second, same IP address associated with a second, same location every weekday at a different time, then the system can determine that the two user IDs have a high probability of corresponding to the same user.

Example Electronic Environments

Figure 7A:
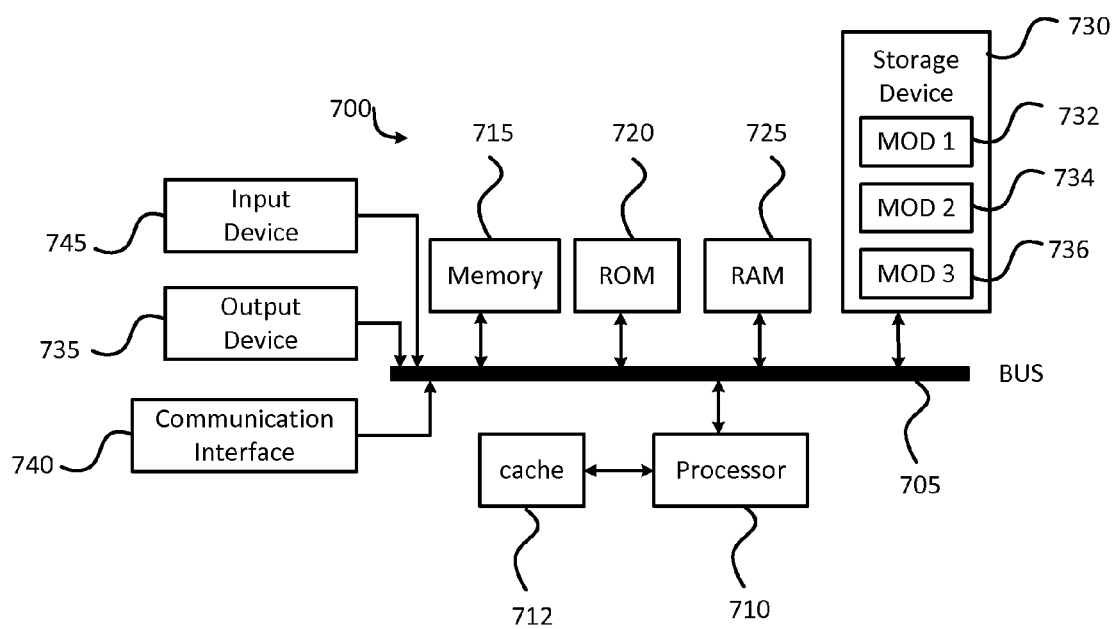
FIG. 7A illustrates an exemplary electronic environment, in accordance with various embodiments.
Figure 7B:
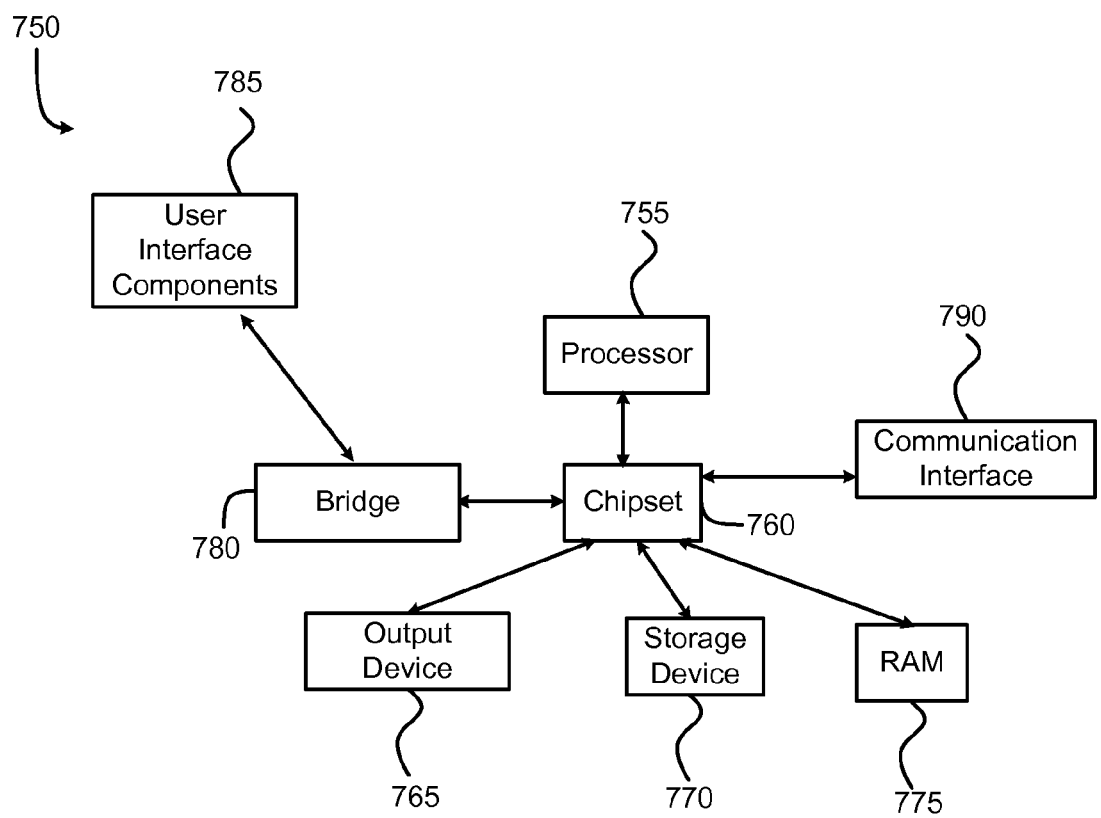
FIG. 7B illustrates an exemplary computer environment, in accordance with various embodiments.

FIG. 7A, and FIG. 7B illustrate exemplary possible system embodiments. FIG. 7A and FIG. 7B, in accordance with some embodiments, may be used to implement the systems and methods described herein, such as identifying co-occurrences of two or more items of inclusion or exclusion data when provided with a dataset of user IDs. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 can be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 can essentially be a completely self-contained computing system, containing multiple cores or processors, a bus, memory controller, cache, etc. A multi-core processor can be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here can easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, by a processor, from one or more computing devices via one or more networks, a first user identifier that is associated with a first electronic device and a second user identifier that is associated with a second electronic device that is different from the first electronic device;
retrieving, by the processor, a dataset comprising a history of network transactions performed by the first user identifier and the second user identifier, wherein the dataset includes a plurality of entries, each entry of the plurality of entries having a respective user identifier associated with a respective attribute of a plurality of attributes;
transforming, by the processor, the first user identifier into a hashed format or a reverse-hashed format to generate a transformed version of the first user identifier;
determining, by the processor, that a match does not exist between the transformed version of the first user identifier and the second user identifier; and
based on determining that the match does not exist:
identifying, by the processor, multiple instances in the dataset in which the first user identifier and the second user identifier are associated with a particular attribute of the plurality of attributes;
determining, by the processor, a probability that the first user identifier and the second user identifier correspond to a same user based on a frequency in which the first user identifier and the second user identifier are associated with the particular attribute of the plurality of attributes within the dataset;
identifying, by the processor, at least one instance in the dataset in which the first user identifier and the second user identifier are associated with different geographic locations, the different geographic locations indicating that the first user identifier and the second user identifier do not correspond to the same user; and
determining, by the processor, that the first user identifier and the second user identifier correspond to the same user based on the probability and the at least one instance in which the first user identifier and the second user identifier are associated with different geographic locations.

2. The computer-implemented method of claim 1, wherein the probability comprises a first probability, and further comprising:
determining a second probability that the first user identifier and the second user identifier correspond to different users based on the at least one instance in which the first user identifier and the second user identifier are associated with the different geographic locations.

3. The computer-implemented method of claim 2, further comprising determining the second probability based on identifying at least one instance in the dataset in which the first user identifier is associated with a first operating system and the second user identifier is associated with a second operating system that is different from the first operating system.

4. The computer-implemented method of claim 1, wherein the first user identifier and the second user identifier each include at least one of: an identifierForAdvertising (IDFA), a platform ID, a unique device identifier (UDID), an Open Device Identification Number (ODIN), or a hashed identification value.

5. The computer-implemented method of claim 4, wherein the first user identifier is of a different type than the second user identifier.

6. The computer-implemented method of claim 1, wherein determining that the first user identifier and the second user identifier correspond to the same user based on the probability comprises determining that the probability meets or exceeds a predetermined threshold that is configured by a user, and wherein the dataset is comprised of data from a plurality of different sources.

7. The computer-implemented method of claim 1, wherein the particular attribute of the plurality of attributes comprises a geographic location.

8. The computer-implemented method of claim 7, wherein the particular attribute of the plurality of attributes comprises at least two attributes, a first attribute of the at least two attributes being the geographic location and a second attribute of the at least two attributes comprising an internet protocol (IP) address.

9. The computer-implemented method of claim 1, wherein the predetermined threshold is dynamic.

10. A non-transitory computer-readable medium storing computer executable instructions for causing a computer to perform a method comprising:
receiving, from one or more computing devices via one or more networks, a first user identifier that is associated with a first electronic device and a second user identifier that is associated with a second electronic device that is different from the first electronic device;
retrieving a dataset comprising a history of network transactions performed by the first user identifier and the second user identifier, wherein the dataset includes a plurality of entries, each entry of the plurality of entries having a respective user identifier associated with a respective attribute of a plurality of attributes;
transforming the first user identifier into a hashed format or a reverse-hashed format to generate a transformed version of the first user identifier;
determining that a match does not exist between the transformed version of the first user identifier and the second user identifier; and
based on determining that the match does not exist:
identifying multiple instances in the dataset in which the first user identifier and the second user identifier are associated with a particular attribute of the plurality of attributes;
determining a probability that the first user identifier and the second user identifier correspond to a same user based on a frequency in which the first user identifier and the second user identifier are associated with the particular attribute of the plurality of attributes within the dataset;
identifying at least one instance in the dataset in which the first user identifier and the second user identifier are associated with different geographic locations, the different geographic locations indicating that the first user identifier and the second user identifier do not correspond to the same user; and
determining that the first user identifier and the second user identifier correspond to the same user based on the probability and the at least one instance in which the first user identifier and the second user identifier are associated with different geographic locations.

11. The non-transitory computer-readable medium of claim 10, wherein the first user identifier and the second user identifier each include at least one of: an identifierForAdvertising (IDFA), a platform ID, a unique device identifier (UDID), an Open Device Identification Number (ODIN), or a hashed identification value.

12. The non-transitory computer-readable medium of claim 10, wherein the dataset is comprised of data from a plurality of different sources.

13. The non-transitory computer-readable medium of claim 10, wherein the particular attribute of the plurality of attributes comprises an internet protocol (IP) address.

14. The non-transitory computer-readable medium of claim 10, wherein the particular attribute of the plurality of attributes comprises a geographic location.

15. A computing system, comprising
one or more processors;
a memory device including instructions that, when executed by the one or more processors, cause the computing system to:
receive, from one or more computing devices via one or more networks, a first user identifier that is associated with a first electronic device and a second user identifier that is associated with a second electronic device that is different from the first electronic device;
retrieve a dataset comprising a history of network transactions performed by the first user identifier and the second user identifier, wherein the dataset includes a plurality of entries, each entry of the plurality of entries having a respective user identifier associated with a respective attribute of a plurality of attributes;
transform the first user identifier into a hashed format or a reverse-hashed format to generate a transformed version of the first user identifier;
determine that a match does not exist between the transformed version of the first user identifier and the second user identifier; and
based on determining that the match does not exist:
identify multiple instances in the dataset in which the first user identifier and the second user identifier are associated with a particular attribute of the plurality of attributes;
determine a probability that the first user identifier and the second user identifier correspond to a same user based on a frequency in which the first user identifier and the second user identifier are associated with the particular attribute of the plurality of attributes within the dataset;
identify at least one instance in the dataset in which the first user identifier and the second user identifier are associated with different geographic locations, the different geographic locations indicating that the first user identifier and the second user identifier do not correspond to the same user; and
determine that the first user identifier and the second user identifier correspond to the same user based on the probability and the at least one instance in which the first user identifier and the second user identifier are associated with different geographic locations.

16. The computing system of claim 15, wherein the probability comprises a first probability, and the instructions further cause the computing system to:
determine a second probability that the first user identifier and the second user identifier correspond to different users based on the at least one instance in which the first user identifier and the second user identifier are associated with the different geographic locations.

17. The computing system of claim 15, wherein the first user identifier and the second user identifier each include at least one of: an identifierForAdvertising (IDFA), a platform ID, a unique device identifier (UDID), an Open Device Identification Number (ODIN), or a hashed identification value.

18. The computing system of claim 15, wherein the dataset is comprised of data from a plurality of different sources.

* * * * *